US011221825B2

(12) United States Patent
Sarir et al.

(10) Patent No.: US 11,221,825 B2
(45) Date of Patent: *Jan. 11, 2022

(54) METHODS AND SYSTEMS FOR CONDUCTING A SESSION OVER AUDIBLE AND VISUAL INTERFACES

(71) Applicant: The Toronto-Dominion Bank, Toronto (CA)

(72) Inventors: Nasim Sarir, Thornhill (CA); Steven Gervais, Newmarket (CA); Peter Horvath, Toronto (CA); Ekas Kaur Rai, Brampton (CA); Peter John Alexander, Toronto (CA); Arun Victor Jagga, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/155,591

(22) Filed: Jan. 22, 2021

(65) Prior Publication Data
US 2021/0149628 A1 May 20, 2021

Related U.S. Application Data

(63) Continuation of application No. 16/104,362, filed on Aug. 17, 2018, now Pat. No. 10,929,098.

(51) Int. Cl.
G06F 3/16 (2006.01)
G06F 3/0481 (2013.01)
G06F 3/0482 (2013.01)

(52) U.S. Cl.
CPC ............ *G06F 3/167* (2013.01); *G06F 3/0482* (2013.01); *G06F 3/04817* (2013.01)

(58) Field of Classification Search
CPC ..... G06F 3/167; G06F 3/04817; G06F 3/0482
See application file for complete search history.

(56) References Cited

U.S. PATENT DOCUMENTS

| | | | |
|---|---|---|---|
| 9,116,989 B1* | 8/2015 | Ehlen | G06F 3/167 |
| 2017/0116990 A1* | 4/2017 | Faaborg | G10L 15/1815 |
| 2017/0148436 A1* | 5/2017 | Sugiura | G10L 15/14 |
| 2018/0143802 A1* | 5/2018 | Jang | G10L 15/26 |
| 2018/0336009 A1* | 11/2018 | Yoganandan | G10L 15/1815 |

* cited by examiner

*Primary Examiner* — Seth A Silverman
(74) *Attorney, Agent, or Firm* — Ridout & Maybee LLP

(57) ABSTRACT

Methods and systems for transferring a user session between at least two electronic devices are described. The user session is conducted as an audible session via an audible interface provided by a primarily audible first electronic device. Input data is received from the audible interface, wherein the input data causes the audible interface to progress through audible interface states. A current audible interface state is mapped to a visual interface state defined for a visual interface. The mapped visual interface state is pushed to a second electronic device having a visual output device for displaying the visual interface, to enable the user session to be continued as a visual session on the second electronic device.

28 Claims, 8 Drawing Sheets

METHODS AND SYSTEMS FOR CONDUCTING A SESSION OVER AUDIBLE AND VISUAL INTERFACES

CROSS-REFERENCE TO RELATED APPLICATION

This application is a continuation of U.S. patent application Ser. No. 16/104,362 filed Aug. 17, 2018, titled METHODS AND SYSTEMS FOR CONDUCTING A SESSION OVER AUDIBLE AND VISUAL INTERFACES, the contents of which are hereby expressly incorporated into the present application by reference in their entirety.

TECHNICAL FIELD

The present disclosure relates to audible interfaces, including interfaces for use with voice-based virtual assistants. In particular, the present disclosure relates to methods and systems for conducting a session over audible and visual interfaces.

BACKGROUND

Voice-based virtual assistants (also referred to simply as voice assistants) are software applications that use voice recognition to receive, interpret and execute audible commands (e.g., voice commands). Voice assistants may be provided by a mobile wireless communication device such as a smartphone, desktop or laptop computer, smart device (such as a smart speaker) or similar internet-of-things (IoT) device.

A drawback of voice assistants is that some interactions during a user session may be too complicated to be easily conducted by audible inputs or outputs. This may be particularly the case where the voice assistant is a primarily audible device that provides an audible interface (such as a smart speaker). In such cases, the user may abandon the interaction instead of attempting the complex interaction by audible inputs or outputs. It would be desirable to provide a solution when a complex interaction is encountered during an audible session.

DESCRIPTION OF EXAMPLE EMBODIMENTS

Figure 1A:
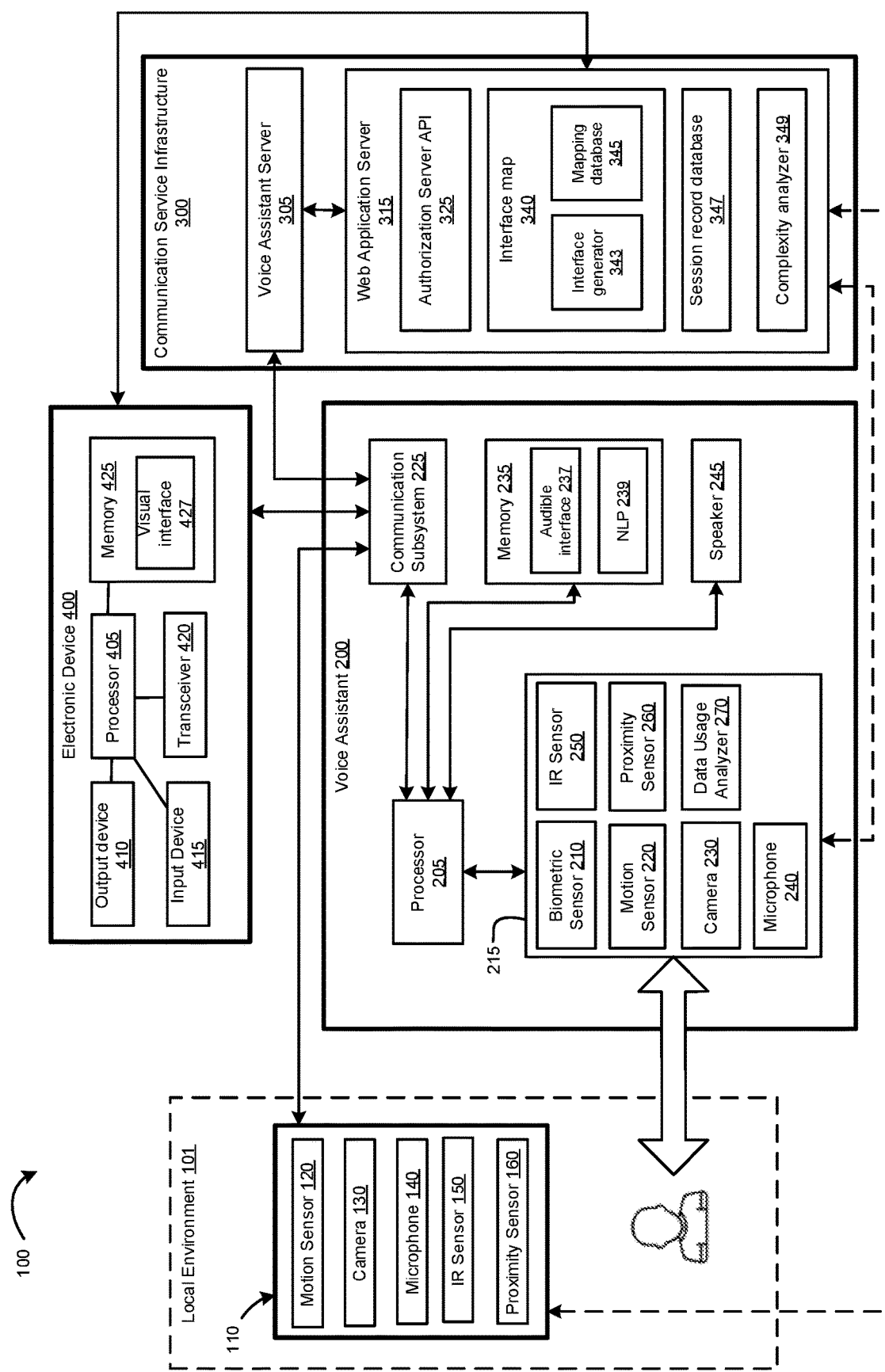
FIGS. 1A and 1B are schematic diagrams of a communication system in accordance with example embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium. Elements referred to in the singular may be implemented in the plural and vice versa, except where indicated otherwise either explicitly or inherently by context.

In accordance with one aspect of the present disclosure, there is provided a server including a communication interface for communication with a first primarily audible electronic device and a second electronic device having a visual output device. The server also includes a processor coupled to the communication interface, and a memory coupled to the processor. The memory has computer-executable instructions stored thereon that, when executed by the processor, cause the server to conduct a user session as an audible-only session via an audible interface provided by the first electronic device. The instructions, when executed, further cause the server to determine that a first interaction during the user session satisfies a complexity criteria. The instructions, when executed, further cause the server to map the first interaction to a mapped visual interface. The instructions, when executed, further cause the server to generate and send a first signal via the communication interface to the second electronic device, the first signal pushing the mapped visual interface, to enable at least the first interaction of the user session to be carried out via the second electronic device.

In accordance with another aspect of the present disclosure, there is provided a method for conducting a user session using at least two electronic devices. The method includes conducting a user session as an audible-only session via an audible interface provided by the first electronic device. The method also includes determining that a first interaction during the user session satisfies a complexity criteria. The method also includes mapping the first interaction to a mapped visual interface. The method also includes pushing the mapped visual interface to the second electronic device, to enable at least the first interaction of the user session to be carried out via the second electronic device.

In any of the above, the first interaction may be determined to satisfy the complexity criteria by applying a complexity-determining rule to the first interaction.

In any of the above, the complexity-determining rule may be applied by calculating a complexity metric for the first interaction and comparing the complexity metric to a complexity threshold.

In any of the above, the first interaction may be mapped to the mapped visual interface by generating the mapped visual interface.

In any of the above, the mapped visual interface may be generated based on one or more contextual factors.

In any of the above, the user session may be further conducted as an audible-visual session using both the audible interface and the mapped visual interface, wherein a current state of the visual interface and a current state of the audible interface are mapped to each other.

In any of the above, during the audible-visual session, input data may be received, related to the visual interface. A response to the input data may be provided by the first or second electronic device, the response being generated based on a context of the visual interface.

In any of the above, the user session may be transferred to be conducted as a visual session on the second electronic device via the mapped visual interface.

In any of the above, the user session may be transferred by mapping a current audible interface state to one of a plurality of visual interface states defined for a visual interface; and pushing a mapped visual interface state, to enable the user session to be continued as a visual session on the second electronic device.

In any of the above, after carrying out the first interaction via the mapped visual interface, the user session may be conducted as an audible-only session via the audible interface on the first electronic device.

In any of the above, prior to conducting the user session as an audible-only session, in response to instructions to initiate the audible session on the first electronic device, the user may be authenticated by: authenticating the second electronic device, requesting authentication data, and receiving the authentication data from the first or second electronic device.

In any of the above, the mapped visual interface may include one or more of: visual output data; one or more input fields; or visual output data generated from audible input data received via the audible interface.

In any of the above, the mapped visual interface may be pushed as a deep link to the mapped visual interface.

In any of the above, the availability of the second electronic device may be detected, and the visual interface may be pushed after detecting the second electronic device is available.

In accordance with further aspects of the present disclosure, there is provided a non-transitory machine readable medium having tangibly stored thereon executable instructions for execution by a processor, such as a processor of a server that is in network communication with a voice assistant device, or a processor of a voice assistant device. The executable instructions, when executed by the processor, cause the server to perform one or more of the methods described above and herein.

Reference is first made to FIG. 1A which shows in schematic block diagram form a communication system 100 in accordance with one example embodiment of the present disclosure. The communication system 100 includes a voice assistant device 200, one or more sensors 110 located in a local environment 101 in the vicinity of the voice assistant device 200, one or more other electronic devices 400, and a communication service infrastructure 300. The voice assistant device 200 is an electronic device that may be a wireless communication device such as a smartphone, desktop or laptop computer, smart device (such as a smart speaker) or similar IoT device. The voice assistant device 200 may function as a voice-based virtual assistant (also referred to simply as a voice assistant). In various embodiments described herein, the voice assistant device 200 may be a primarily audible device, which receives audio input (e.g., voice commands from a user) and outputs audio output (e.g., from a speaker) and which does not make use of a visual interface.

The one or more sensors 110 may include a motion sensor 120, a camera 130, a microphone 140, an infrared (IR) sensor 150, and/or a proximity sensor 160, and/or combinations thereof. The one or more sensors 110 are communicatively coupled to the voice assistant device 200 via wireless and/or wired connections. The one or more sensors 110 sense a coverage area within the local environment 101. The one or more sensors 110 may be spaced around the local environment 101 to increase the coverage area. The local environment 101 may be a room, a number of rooms, a house, apartment, condo, hotel or other similar location.

The voice assistant device 200 communicates with the electronic device 400 via a communication network (not shown) such as the Internet. The voice assistant device 200 also communicates with the communication service infrastructure 300 via the communication network. In some examples, the electronic device 400 may also communicate with the communication service infrastructure 300 via the communication network. Different components of the communication system 100 may communicate with each other via different channels of the communication network, in some examples.

The communication network enables exchange of data between the voice assistant device 200, the communication service infrastructure 300 and the electronic device 400. The communication network may comprise a plurality of networks of one or more network types coupled via appropriate methods known in the art, comprising a local area network (LAN), such as a wireless local area network (WLAN) such as Wi-Fi™, a wireless personal area network (WPAN), such as Bluetooth™ based WPAN, a wide area network (WAN), a public-switched telephone network (PSTN), or a public-land mobile network (PLMN), also referred to as a wireless wide area network (WWAN) or a cellular network. The WLAN may include a wireless network which conforms to IEEE 802.11x standards or other communication protocol.

The voice assistant device 200 is equipped for one or both of wired and wireless communication. The voice assistant device 200 may be equipped for communicating over LAN, WLAN, Bluetooth, WAN, PSTN, PLMN, or any combination thereof. The voice assistant device 200 may communicate securely with other devices and systems using, for example, Transport Layer Security (TLS) or its predecessor Secure Sockets Layer (SSL). TLS and SSL are cryptographic protocols which provide communication security over the Internet. TLS and SSL encrypt network connections above the transport layer using symmetric cryptography for privacy and a keyed message authentication code for message reliability. When users secure communication using TSL or SSL, cryptographic keys for such communication are typically stored in a persistent memory of the voice assistant device 200.

The voice assistant device 200 includes a controller comprising at least one processor 205 (such as a microprocessor) which controls the overall operation of the voice assistant device 200. The processor 205 is coupled to a plurality of components via a communication bus (not shown) which provides a communication path between the components and the processor 205.

In this example, the voice assistant device 200 includes a number of sensors 215 coupled to the processor 205. The sensors 215 may include a biometric sensor 210, a motion sensor 220, a camera 230, a microphone 240, an infrared (IR) sensor 250 and/or a proximity sensor 260. A data usage monitor and analyzer 270 may be used to automatically capture data usage, and may also be considered to be a sensor 215. The sensors 215 may include other sensors (not shown) such as a satellite receiver for receiving satellite signals from a satellite network, orientation sensor, electronic compass or altimeter, among possible examples.

The processor 205 is coupled to one or more memories 235 which may include Random Access Memory (RAM), Read Only Memory (ROM), and persistent (non-volatile) memory such as flash memory, and a communication subsystem 225 for communication with the communication service infrastructure 300. The communication subsystem 225 includes one or more wireless transceivers for exchanging radio frequency signals with wireless networks of the communication system 100. The communication subsystem 225 may also include a wireline transceiver for wireline communications with wired networks.

The wireless transceivers may include one or a combination of Bluetooth transceiver or other short-range wireless transceiver, a Wi-Fi or other WLAN transceiver for communicating with a WLAN via a WLAN access point (AP), or a cellular transceiver for communicating with a radio access network (e.g., cellular network). The cellular transceiver may communicate with any one of a plurality of fixed transceiver base stations of the cellular network within its geographic coverage area. The wireless transceivers may include a multi-band cellular transceiver that supports multiple radio frequency bands. Other types of short-range wireless communication include near field communication (NFC), IEEE 802.15.3a (also referred to as UltraWideband (UWB)), Z-Wave, ZigBee, ANT/ANT+ or infrared (e.g., Infrared Data Association (IrDA) communication). The wireless transceivers may include a satellite receiver for receiving satellite signals from a satellite network that includes a plurality of satellites which are part of a global or regional satellite navigation system.

The voice assistant device 200 includes one or more output devices, including a speaker 245 for providing audio output. The one or more output devices may also include a display (not shown). In some examples, the display may be part of a touchscreen. The touchscreen may include the display, which may be a color liquid crystal display (LCD), light-emitting diode (LED) display or active-matrix organic light-emitting diode (AMOLED) display, with a touch-sensitive input surface or overlay connected to an electronic controller. In some examples, the voice assistant device 200 may be a primarily audible device (e.g., where the voice assistant device 200 is a smart speaker), having only or primarily audio output devices such as the speaker 245. The voice assistant device 200 may also include one or more auxiliary output devices (not shown) such as a vibrator or light-emitting diode (LED) notification light, depending on the type of voice assistant device 200. It should be noted that even where the voice assistant device 200 is a primarily audible device, an auxiliary output device may still be present (e.g., an LED to indicate power is on).

The voice assistant device 200 includes one or more input devices, including a microphone 240 for receiving audio input (e.g., voice input). The one or more input devices may also include one or more additional input devices (not shown) such as buttons, switches, dials, a keyboard or keypad, or navigation tool, depending on the type of voice assistant device 200. In some examples, the voice assistant device 200 may be a primarily audible device (e.g., where the voice assistant device 200 is a smart speaker), having only or primarily audio input devices such as the microphone 240. The voice assistant device 200 may also include one or more auxiliary input devices (not shown) such as a button, depending on the type of voice assistant device 200. It should be noted that even where the voice assistant device 200 is a primarily audible device, an auxiliary input device may still be present (e.g., a power on/off button).

The voice assistant device 200 may also include a data port (not shown) such as serial data port (e.g., Universal Serial Bus (USB) data port).

In the voice assistant device 200, operating system software executable by the processor 205 is stored in the persistent memory of the memory 235 along with one or more applications, including a voice assistant application. The voice assistant application comprises instructions for implementing an audible interface 237 (e.g., a voice user interface (VUI)), to enable a user to interact with and provide instructions to the voice assistant device 200 via audible (e.g., voice) input. The memory 235 may also include a natural language processing (NLP) function 239, to enable audible input to be analyzed into commands, input and/or intents, for example. Other applications such as mapping, navigation, media player, telephone and messaging applications, etc. may also be stored in the memory. The voice assistant application, when executed by the processor 205, allows the voice assistant device 200 to perform at least some embodiments of the methods described herein. The memory 235 stores a variety of data, including sensor data acquired by the sensors 215; user data including user preferences, settings and possibly biometric data about the user for authentication and/or identification; a download cache including data downloaded via the wireless transceivers; and saved files. System software, software modules, specific device applications, or parts thereof, may be temporarily loaded into RAM. Communication signals received by the voice assistant device 200 may also be stored in RAM. Although specific functions are described for various types of memory, this is merely one example, and a different assignment of functions to types of memory may be used in other embodiments.

The communication service infrastructure 300 includes a voice assistant server 305 and a web application server 315. The voice assistant server 305 and the web application server 315 each includes a communication interface (not shown) to enable communications with other components of the communication system 100. The web application server 315 provides an authorization server application programming interface (API) 325 and an interface map function 340, among other APIs and functions. The web application server 315 may provide services and functions for the voice assistant device 200. For example, the web application server 315 may include the interface map function 340, which may enable a visual user interface (e.g., a graphical user interface (GUI)) to be mapped to an audible user interface (e.g., a voice user interface (VUI)) and vice versa, as discussed further below. The interface map function 340 may include sub-modules or sub-functions, such as an interface generator 343 and a mapping database 345. The web application server 315 may also include a session record database 347, in which a state of an ongoing user session may be saved, as discussed further below. The web application server 315 may also include a complexity analyzer 349, which may determine whether an interaction satisfies a complexity criteria, as discussed further below. The voice assistant server 305 and the web application server 315 may be operated by different entities, introducing an additional security in allowing the voice assistant server 305 to assess data of the web application server 315, particularly private data such as banking information. In other embodiments, the voice assistant server 305 may be a server module of the web application server 315 rather than a distinct server. Each of the web application server 315 and voice assistant server 305 may be implemented by a single computer system that may include one or more server modules.

The voice assistant application (e.g., stored in the memory 235 of the voice assistant device 200) may be a client-side component of a client-server application that communicates with a server-side component of the voice assistant server 305. Alternatively, the voice assistant application may be a client application that interfaces with one or more APIs of the web application server 315 or IoT device manager 350. One or more functions/modules described as being implemented by the voice assistant device 200 may be implemented or provided by the voice assistant server 305 or the web application server 315. For example, the NLP function 239 may be implemented in the voice assistant server 305 instead of the voice assistant device 200. In another example, the audible interface function 237 may not be implemented in the voice assistant device 200. Instead, the web application server 315 or voice assistant server 305 may store instructions for implementing an audible interface.

The electronic device 400 in this example includes a controller including at least one processor 405 (such as a microprocessor) which controls the overall operation of the electronic device 400. The processor 405 is coupled to a plurality of components via a communication bus (not shown) which provides a communication path between the components and the processor 405.

Examples of the electronic device 400 include, but are not limited to, handheld or mobile wireless communication devices, such as smartphones, tablets, laptop or notebook computers, netbook or ultrabook computers; as well as vehicles having an embedded-wireless communication system, such as a Wi-Fi or cellular equipped in-dash infotainment system, or tethered to another wireless communication device having such capabilities. Mobile wireless communication devices may include devices equipped for cellular communication through PLMN or PSTN, mobile devices equipped for Wi-Fi communication over WLAN or WAN, or dual-mode devices capable of both cellular and Wi-Fi communication. In addition to cellular and Wi-Fi communication, a mobile wireless communication device may also be equipped for Bluetooth and/or NFC communication. In various embodiments, the mobile wireless communication device may be configured to operate in compliance with any one or a combination of a number of wireless protocols, including Global System for Mobile communications (GSM), General Packet Radio Service (GPRS), code-division multiple access (CDMA), Enhanced Data GSM Environment (EDGE), Universal Mobile Telecommunications System (UMTS), Evolution-Data Optimized (EvDO), High Speed Packet Access (HSPA), $3^{rd}$ Generation Partnership Project (3GPP), or a variety of others. It will be appreciated that the mobile wireless communication device may roam within and across PLMNs. In some instances, the mobile wireless communication device may be configured to facilitate roaming between PLMNs and WLANs or WANs.

The electronic device 400 includes one or more output devices 410 coupled to the processor 405. The one or more output devices 410 may include, for example, a speaker and a display (e.g., a touchscreen). Generally, the output device(s) 410 of the electronic device 400 is capable of providing visual output and/or other types of non-audible output (e.g., tactile or haptic output). The electronic device 400 may also include one or more additional input devices 415 coupled to the processor 405. The one or more input devices 415 may include, for example, buttons, switches, dials, a keyboard or keypad, or navigation tool, depending on the type of electronic device 400. In some examples, an output device 410 (e.g., a touchscreen) may also serve as an input device 415. A visual interface, such as a GUI, may be rendered and displayed on the touchscreen by the processor 405. A user may interact with the GUI using the touchscreen and optionally other input devices (e.g., buttons, dials) to display relevant information, such as banking or other financial information, etc. Generally, the electronic device 400 may be configured to process primarily non-audible input and to provide primarily non-audible output.

The electronic device 400 may also include one or more auxiliary output devices (not shown) such as a vibrator or LED notification light, depending on the type of electronic device 400. The electronic device 400 may also include a data port (not shown) such as a serial data port (e.g., USB data port).

The electronic device 400 may also include one or more sensors (not shown) coupled to the processor 405. The sensors may include a biometric sensor, a motion sensor, a camera, an IR sensor, a proximity sensor, a data usage analyser, and possibly other sensors such as a satellite receiver for receiving satellite signals from a satellite network, orientation sensor, electronic compass or altimeter.

The processor 405 is coupled to one or more wireless transceivers 420 for exchanging radio frequency signals with a wireless network that is part of the communication network. The processor 405 is also coupled to a memory 425, such as RAM, ROM or persistent (non-volatile) memory such as flash memory. In some examples, the electronic device 400 may also include a satellite receiver (not shown) for receiving satellite signals from a satellite network that comprises a plurality of satellites which are part of a global or regional satellite navigation system.

The one or more transceivers 420 may include one or a combination of Bluetooth transceiver or other short-range wireless transceiver, a Wi-Fi or other WLAN transceiver for communicating with a WLAN via a WLAN access point (AP), or a cellular transceiver for communicating with a radio access network (e.g., cellular network).

Operating system software executable by the processor 405 is stored in the memory 425. A number of applications executable by the processor 405 may also be stored in the memory 425. For example, the memory 425 may store instructions for implementing a visual interface 427 (e.g., a GUI). The memory 425 also may store a variety of data. The data may include sensor data sensed by the sensors; user data including user preferences, settings and possibly biometric data about the user for authentication and/or identification; a download cache including data downloaded via the transceiver(s) 420; and saved files. System software, software modules, specific device applications, or parts thereof, may be temporarily loaded into a volatile store, such as RAM, which is used for storing runtime data variables and other types of data or information. Communication signals received by the electronic device 400 may also be stored in RAM. Although specific functions are described for various types of memory, this is merely one example, and a different assignment of functions to types of memory may be used in other embodiments.

The electronic device 400 may also include a power source (not shown), for example a battery such as one or more rechargeable batteries that may be charged, for example, through charging circuitry coupled to a battery interface such as a serial data port. The power source provides electrical power to at least some of the components of the electronic device 400, and a battery interface may provide a mechanical and/or electrical connection for the battery.

One or more functions/modules described as being implemented by the electronic device 400 may be implemented or provided by the web application server 315. For example, the visual interface function 427 may not be implemented in the electronic device 400. Instead, the web application server 315 may store instructions for implementing a visual interface.

The above-described communication system 100 is provided for the purpose of illustration only. The above-described communication system 100 includes one possible communication network configuration of a multitude of possible configurations. Suitable variations of the communication system 100 will be understood to a person of skill in the art and are intended to fall within the scope of the present disclosure. For example, the communication service infrastructure 300 may include additional or different elements in other embodiments. In some embodiments, the system includes multiple components distributed among a plurality of computing devices. One or more components may be in the form of machine-executable instructions embodied in a machine-readable medium.

Data from the electronic device 400 and/or the sensor(s) 110 may be received by the voice assistant device 200 (e.g., via the communication subsystem 225) for processing, or for forwarding to a remote server, such as the web application server 315 (optionally via the voice assistant server 305), for processing. Data may also be communicated directly between the electronic device 400 and the web application server 315.

In some examples, sensor data may be communicated directly (indicated by dashed arrows) from the sensor(s) 110 to the remote server (e.g. the web application server 315), for example wirelessly via Wi-Fi, without being handled through the voice assistance device 200. Similarly, the sensors 215 of the voice assistant device 200 may communicate directly (indicated by dashed arrow) with the remote server, (e.g. the web application server 315), for example wirelessly via Wi-Fi, without being handled through the voice assistance server 305. The voice assistant device 200 may still communicate with the voice assistance server 305 for the communications session, but sensor data may be communicated directly to the web application server 315 via a separate data channel.

Figure 1B:
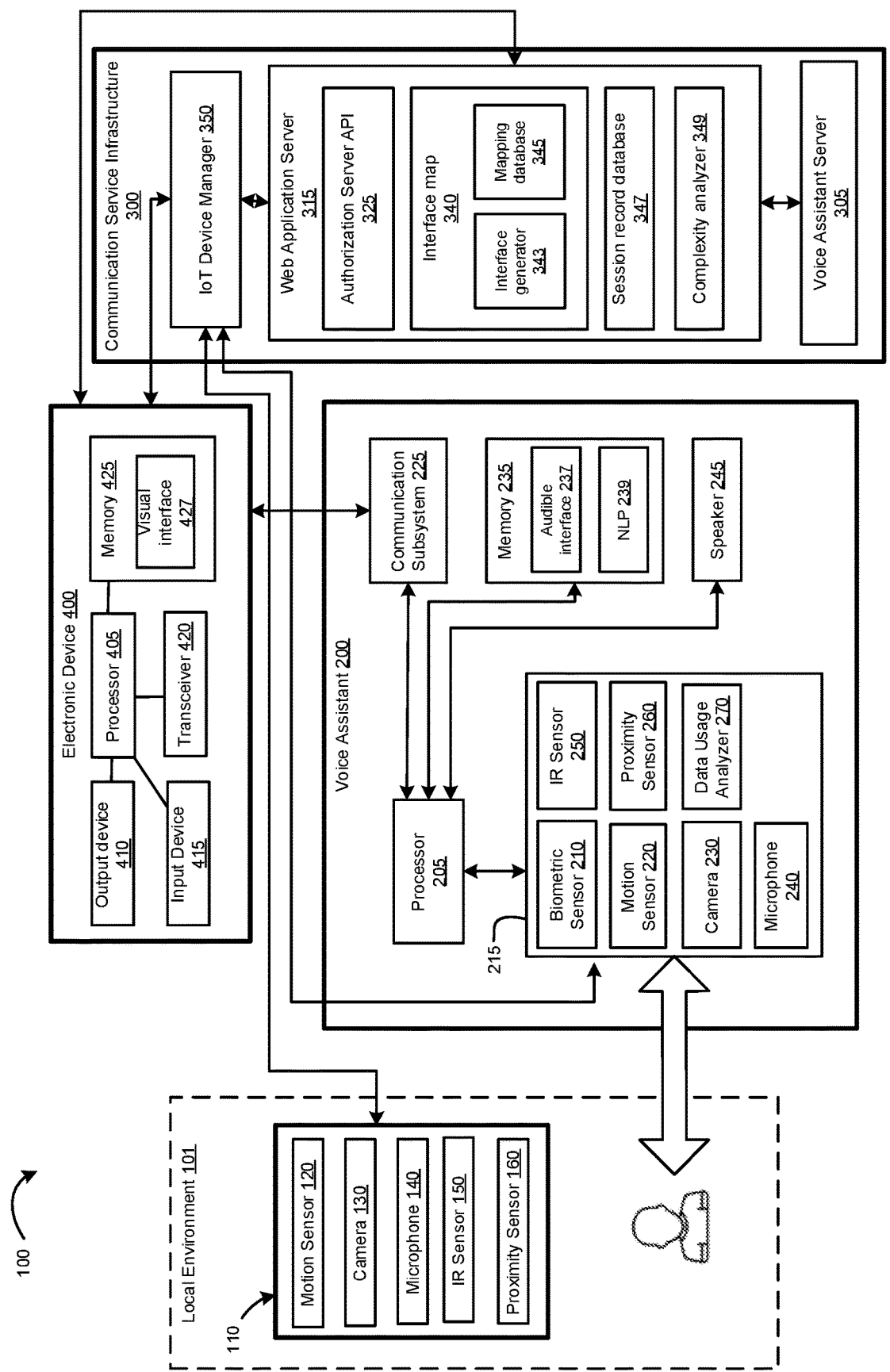

FIG. 1B shows another example embodiment of the communication system 100. The communication system 100 shown in FIG. 1B is similar to the communication system 100 shown in FIG. 1A, with differences as discussed below.

In FIG. 1B, the one or more sensors 110 in the local environment 101, the sensors 215 of the voice assistant device 200 and the connected electronic device 400 communicate with an IoT device manager 350 that is part of the communication service infrastructure 300. The IoT device manager 350 is connected to the web application server 315, and forwards the acquired sensor data to the web application server 315 for processing. In the embodiment of FIG. 1B, the voice assistant device 200 may still communicate with the voice assistance server 305 for the communications session, but sensor data may be communicated to the web application server 315 via a separate data channel. Similarly, the electronic device 400 may still communicate with the voice assistant device 200, but sensor data from the electronic device 400 may be communicated to the web application server 315 via the IoT device manager 350. Communication of other data (e.g., other non-sensor data) may be communicated as described above with reference to FIG. 1A.

Figure 2:
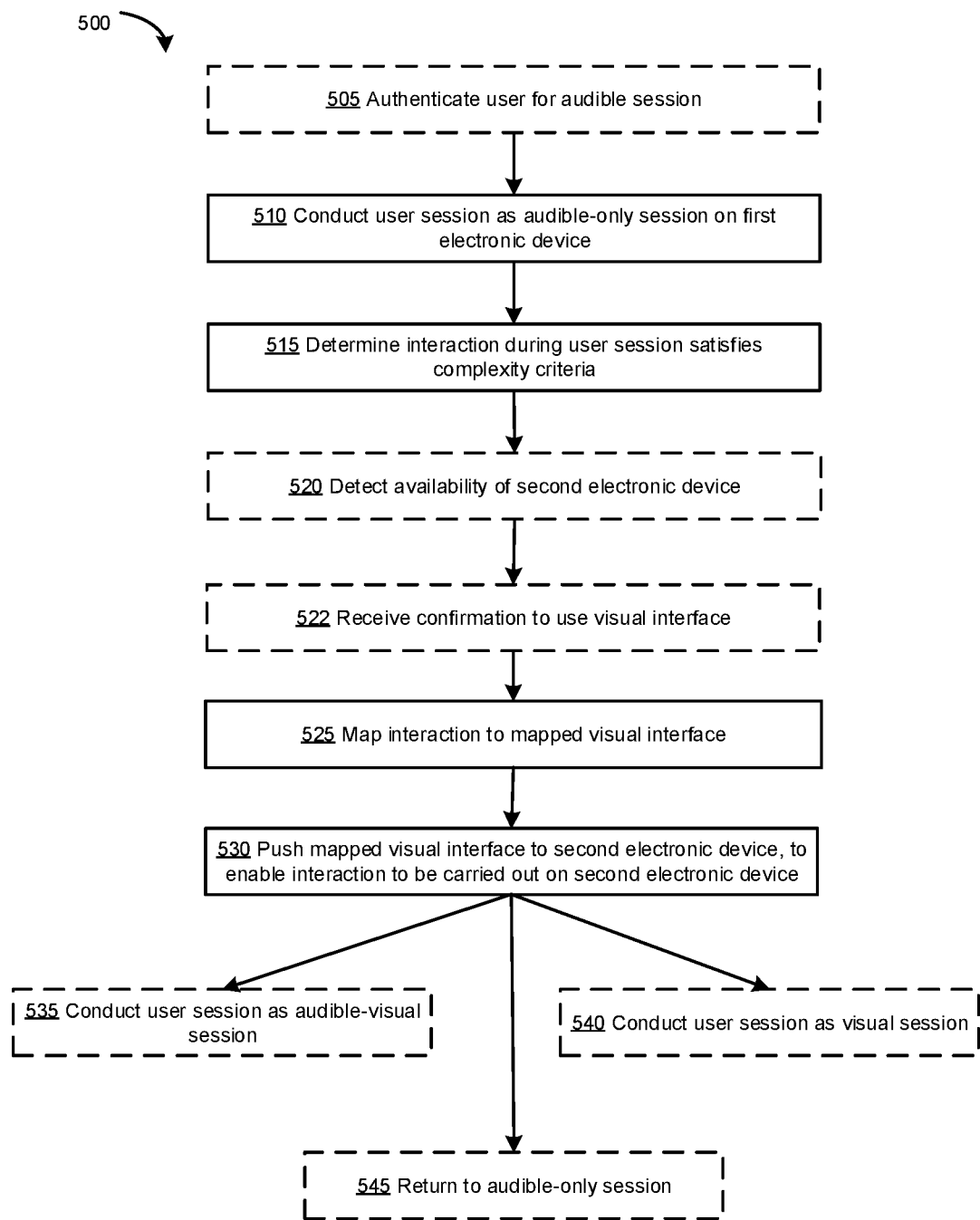
FIG. 2 is a flowchart illustrating an example method for conducting a session when there is a complex interaction, in accordance with an example embodiment of the present disclosure.

Reference is now made to FIG. 2, illustrating an example method 500 for conducting a user session using audible and visual interfaces, in accordance with one example embodiment of the present disclosure. In some examples, the example method 500 may be performed by the web application server 315. The web application server 315 may serve to coordinate data between audible and visual interfaces (e.g., by mapping and/or tracking between audible and visual interfaces), and to communicate data between the voice assistant device 200 and the electronic device 400 in a seamless and real-time manner.

The method 500 may involve conducting a user session as an audible session, using the voice assistant device 200, and mapping an interaction during the audible session to a visual session, which may be conducted using another electronic device 400. The user session may optionally be continued as an audible-visual session, as a visual session, or returned to an audible session. Notably, the method 500 includes mapping an interaction that is part of the audible-only session to a visual interface, when it is determined that the interaction satisfies a complexity criteria.

As will be appreciated in light of the present disclosure, there may be interactions (including inputs and/or outputs) that could be better carried out using a visual interface instead of an audible interface. For example, the way a user interacts with an audible interface (e.g., using serial inputs/outputs) may be fundamentally different from the way a user interacts with a visual interface (e.g., capable of parallel inputs, or providing inputs and outputs at the same time). This may result in certain interactions (e.g., input of a long string of characters, such as an address; or output of highly detailed information, such as comparison of products) being better suited to a visual interface, rather than an audible interface. At the same time, the audible interface may provide a more natural and intuitive way (e.g., asking verbal questions) for the user to interact with the system.

In examples disclosed herein, there is provided a way for audible and visual interfaces to be used in a complementary fashion during a user session. The visual interface does not only serve to provide visual output to support the audible session, but may become the primary interface for the user session (optionally with the audible interface being used in a supporting role). The audible and visual interfaces may track each other. The ability for a visual interface to receive inputs and provide interactive outputs, as a complement to an audible interface; and the ability for an audible interface to receive audible inputs and provide audible outputs, as a complement to a visual interface; may provide a more seamless user experience.

At 505, optionally, the user is authenticated prior to conducting the audible session. Authentication may be required, for example, when a user makes a request (e.g., via audible input such as a voice command) to initiate a new session as an audible session with the voice assistant device 200. Authentication may also be required, for example, when an ongoing non-audible session is to be transferred to an audible session. An example of an authentication method will be discussed further below with respect to FIG. 4.

At 510, a user session is conducted as an audible session on a first electronic device. The first electronic device is a primarily audible device, such as the voice assistant device 200, which provides an audible interface for conducting the audible session. The audible interface may be an interface for a web application, such as a banking session of a banking application of a financial institution. For example, a user may use the audible interface during the audible session to perform banking transactions (e.g., transfer funds), to obtain information from the financial institution (e.g., ask about mortgage rates) or to apply for a bank account, among other possibilities.

The user may interact with the audible interface using audible input (e.g., voice input) that is received by the microphone 240 of the voice assistant device 200. The processor 205 of the voice assistant device 200 receives and interprets the voice input (e.g., using NLP function 239). Interpreting the voice input by the voice assistant device 200 may include, for example, performing voice recognition to identify one or more words in the voice sample, matching the one or more words to a command, instruction or intent, and optionally one or more parameters relevant to the command, instruction or intent.

The input data may be provided by the voice assistant device 200 to the voice assistant server 305 via the communication subsystem 225 (e.g., via a wireless transceiver). The voice assistant server 305 forwards the API call to the web application server 315 providing the web application and its communication service, such as the banking session for the banking application of the financial instruction. Alternatively, in other embodiments the API call is sent by the voice assistant device 200 directly to the web application server 315 without a voice assistant server 305. The web application server 315 may then process the input data, for example to determine an appropriate response to provide via the audible interface, or to determine whether the audible interface should progress to a next audible interface state.

The received input may enable the audible interface to progress through a plurality of audible interface states. Generally, each audible interface has defined a plurality of audible interface states, each state defining an audible output to be provided to the user or an audible input to be requested from the user. An audible interface state may include information relevant to the context of the audible session, such as information provided by the user and/or any previous states. Because audible information is typically provided in a serial manner, each valid audible input provided to the audible interface may be expected to progress the audible interface to the next audible interface state.

At 515, it is determined whether an interaction during the audible user session satisfies a complexity criteria. An interaction may be an input interaction or an output interaction. Thus, 515 may be performed when an input is required from the user and/or when an output is to be provided to the user. For example, the web application server 315 may use the complexity analyzer 349 to evaluate whether the interaction satisfies one or more complexity criteria.

The complexity analyzer 349 may have a predetermined set of criteria for determining whether an interaction is considered to be complex. Generally, a complex interaction may be any interaction that may be considered difficult, time-consuming and/or cumbersome to be performed via the audible interface, and/or any interaction that may be more easy, efficient and/or intuitive to be provided via the visual interface. For example, outputting information about different products may be more efficient via a visual comparison table on a visual interface; or inputting information about a user's address may be less error-prone using an input field on a visual interface.

The complexity analyzer 349 may implement one or more complexity-determining rule to determine whether the interaction satisfied the complexity criteria. A complexity-determining rule may include, for example, whether the interaction is input/output of a certain type (e.g., user's email or user's address may be easier to input via visual interface), a certain format (e.g., pictorial or table output may be suited to visual interface), a certain security level (e.g., personal information kept more private by providing on visual interface), or having other predetermined characteristic. Another complexity-determining rule may be whether the interaction has been labeled as being complex. For example, a web application may have been programmed to indicate a certain interaction is complex and is preferred to be provided via a visual interface. Another complexity-determining rule may include calculating a complexity metric for the interaction and comparing the calculated complexity metric to a complexity threshold. A complexity metric may be calculated by, for example, calculating the number of words in an output, or calculating the number of input fields requested. The complexity metric may then be compared to a predetermined complexity threshold, and if the threshold is exceeded (e.g., more than 50 words in the output, or more than 5 input fields) then the interaction may be determined to satisfy the complexity criteria.

Another example complexity metric may be calculated by, for example, considering the time to output an audible request from the audible interface and also considering the expected time required for providing one or more expected audible response. The time required to output an audible request by the audible interface may be known, for example determined by measuring the actual output time, or determined based on stored data (e.g., previous measurement of output time, or preprogrammed data). The time required for a user to provide an audible response may be based on estimate(s) of the expected time(s) required to provide one or more expected responses (which may vary based on the outputted request). The complexity metric may then be calculated by summing the average expected time for expected response(s) and the known time for the outputted audible request. If this complexity metric exceeds a predetermined complexity threshold, then the interaction may be determined to satisfy the complexity criteria. For example, the audible interface may output an audible request such as "how long will your mortgage amortization time be". The complexity analyzer 349 may determine (e.g., based on previous measurements and/or based on preprogrammed data) that it will take 30 s to output that audible request. The complexity analyzer 349 may also determine that the expected response is one of three possible answers: 5, 10 or 25 years and estimate that the average expected time to speak those three responses is 5 s. Thus, the complexity analyzer 349 may calculate the complexity metric to be a total interaction time of 35 s. The complexity analyzer 349 may then compare this calculated complexity metric to a predetermined complexity threshold (e.g., a total interaction time of 30 s) and determine that the interaction is a complex interaction.

More generally, the expected time for a user to progress from one audible interface state to the next (e.g., the time required for output of an audible request together with the time required to provide an audible input responding to the request) may be a complexity metric, and the complexity criteria may be whether this expected time complexity metric exceeds a predetermined threshold time.

In some examples, the expected time to provide the visual interface corresponding to an audible interaction may also be taken into consideration when calculating the complexity metric. For example, there may be an expected time associated with, for example, the user activating the second electronic device and viewing the visual interface, and providing a response via the visual interface. The expected time to progress to a next state using a visual interface may be compared with the expected time to progress to a next state using an audible interface. The difference between the two expected times may be compared to a predetermined threshold time, and the complexity criteria may be satisfied if the difference exceeds 10 s in favor of the visual interface, for example. In some examples, the proximity of the second electronic device may be considered when calculating the expected time for the user to activate the second electronic device (e.g., the farther the second electronic device, the more time is required for the user to activate the second electronic device).

At 520, optionally, the availability of the second electronic device may be detected. For example, the web application server 315 or the IoT device manager 350 may detect sensor data from the second electronic device (e.g., data from a location sensor on the electronic device 400) to indicate that the electronic device 400 is in the local environment 101 in which the voice assistant device 200 is located. In some examples, the IoT device manager 350 may implement a location detection module that receives location data (e.g., GPS data, beacon data, radiofrequency ID data, Bluetooth data, IP address data or MAC address data, among other possibilities) from respective sensors on the voice assistant device 200 and the electronic device 400, and determine whether the electronic device 400 is within a predefined radius of the voice assistant device 200. Detecting availability of the second electronic device may also include detecting whether the second electronic device is powered on (e.g., by detecting whether the second electronic device is responsive to a ping from the web application server 315).

In some examples, detecting the availability of the second electronic device may include detecting whether the second electronic device has been authenticated (e.g., using any suitable authentication techniques, such as exchanging security certificates). If the second electronic device has not been authenticated as belonging to the user, authentication may be required before the second electronic device is considered to be available.

In some examples, optional step 520 may take place earlier in the method 500. For example, detecting availability of the second electronic device may be performed prior to determining whether an interaction satisfies a complexity criteria.

At 522, optionally, a confirmation may be received to use the visual interface to perform the complex interaction. This may include, for example, providing an option via the audible interface to indicate that the user can choose to use the visual interface (e.g., "do you want to answer using your phone?") and receiving confirmation in response (e.g., "yes"). In some examples, the option may also be provided via the second electronic device (e.g., a notification on the second electronic device). The confirmation may be provided via audible input (e.g., "yes") or non-audible input (e.g., user selects an option on the second electronic device to use visual interface). In some examples, the confirmation may be implicit. For example, the confirmation may be detected by receiving sensor data (e.g., gyroscope sensor data and/or face recognition sensor data) from the second electronic device indicating that the user has picked up and/or is looking at the second electronic device. In some examples, the user may be prompted to provide a confirmation when the interaction has been determined to be on the threshold of being complex (e.g., the complexity metric is very close to the complexity threshold).

At 525, the interaction is mapped to a visual interface. This mapping may be performed by the web application server 315, using the interface map function 340, for example. In some examples, the interaction may be mapped to a particular state of the visual interface, where the mapped visual interface state corresponds to a current state of the audible interface. In some examples, the visual interface may fully substitute the audible interface. For example, the visual interface may only provide an interface for performing the complex interaction, after which the audible interface must be used to continue the user session.

In some examples, prior to mapping the visual interface, the current state of the audible interface may be saved by the web application server 315, for example stored in the session record database 347. The saved interface state may include information about the context of the audible session, such as information that has been received from the user and/or information that has been provided to the user (e.g., a current product page or completed input fields in an application). The current audible interface state may be saved at regular intervals, or after each valid voice input, among other possibilities.

In some examples, after saving the interface state, the user session may be suspended. Suspension of the session may allow the user to access the second electronic device to use the visual interface. The suspended session may be continued by the user completing the complex interaction using the visual interface, for example.

In some examples, performing the mapping may include generating the mapped visual interface. In such examples, the interface map function 340 may implement the interface generator 343. Generation of the mapped visual interface may, for example, take into account one or more contextual factors. A contextual factor may include, for example, device factors (e.g., the type of display provided by the second electronic device), accessibility factors (e.g., whether the visual interface should be modified or augmented, such as by providing larger font or providing haptic output), or aesthetic factors (e.g., user preference to display images). The web application server 315 may query the session record database 347, a user profile database or may query the second electronic device, for example, to determine such contextual factor(s) for generating the mapped visual interface state. For example, the web application server 315 may detect that the second electronic device has a small display and therefore the mapped visual interface state may be generated to avoid using pictures.

The interface map function 340 may implement a set of rules, for example, that govern how the interaction should be mapped to a visual interface. In some examples, the mapping may be performed using a pre-defined interaction-visual interface map (which may be pre-programmed as part of the web application, or which may be pre-programmed based on the type of interaction), which defines the relationship between one or more interactions and the corresponding visual interface. The set of rules and/or the predefined interaction-visual interface map may be stored in the mapping database 345 (e.g., internal to the interface map function 340), for example, which may be referenced by the interface map function 340. In some examples, where a corresponding visual interface has not been defined (e.g., where the web application has been designed to be primarily accessed via the audible interface), the interface map function 340 may generate the visual interface (e.g., using the interface generator 343) by, for example, converting audible output to textual output.

In some examples, the interface map function 340 may query one or more other databases to access additional information required to perform the mapping. For example, where the audible session involves completing an application form, the saved audible interface state may include user inputs for certain fields of the application form, but may not include a visual representation of the application form itself. The interface map function 340 may instead query another database (which may be internal to the web application server 315 or may be an external database) to obtain information for providing a visual representation of the application form in the mapped visual interface.

One interaction during the audible session may not necessarily map to one visual interface. For example, because audible interactions tend to take place using serial audio inputs/outputs, two or more interactions may map to the same visual interface. For example, interactions involving inputting user information into a form (e.g., name, address and email information) may all map to a single visual interface having multiple corresponding input fields (e.g., single form having inputs fields for inputting name, address and email information).

At 530, the mapped visual interface is pushed to the second electronic device, to enable the user session to be continued as a visual session. In some examples, the mapped visual interface may be pushed as a deep link (which may be also generated by the interface map function 340), which may link to a page of the web application corresponding to the mapped visual interface. The deep link may be used by the second electronic device to automatically provide the mapped visual interface, when the user accesses the web application on the second electronic device. The deep link may also be provided to the user (e.g., in an email or other notification), and the mapped visual interface may be provided when the user selects the deep link.

Pushing the mapped visual interface to the second electronic device may be performed using an interface module on the web application server 315, for example. The interface module may receive data from the interface map function 340 to be pushed to the second electronic device. In some examples, there may be more than one electronic device available having visual output capability. The interface module may be configured to select one of the available electronic devices (e.g., the electronic device that is located closest to the voice assistant device) to display the visual interface.

In some examples, the mapped visual interface may be pushed as a data packet, which may include: a web address for the specific page in the web application, code creating a visual output on the second electronic device, a deep link to a page of the web application, an image of the page of the web application and/or a file of the page in the web application, among other possibilities.

To prepare the data packet to be pushed to the second electronic device, the interface module may add instructions (e.g., included with the pushed data packet, or appended as another data packet) to cause the second electronic device to generate a notification (e.g., an email) informing the user that the visual interface is accessible on the second electronic device. The notification may include a selectable link to display the visual interface. In some examples, the data packet may also be encrypted.

In some examples, information about the mapped visual interface may be saved to the session record database 347. This may enable the web application server 315 to determine the context of what is being displayer to the user. Such information may enable the web application server 315 to coordinate the audible interface with the visual interface (and vice versa), for example to enable the user session to be conducted as a joint audible-visual interface, as discussed further below.

It should be noted that the mapped visual interface may be pushed to the second electronic device in the background, without the user being aware. For example, the web application server 315 may push data to the second electronic device to enable the second electronic device to generate the mapped visual interface, however this pushed data may be stored by the second electronic device. The stored data may be later used to generate the visual interface on the display of the second electronic device, for example in response to user input to access the web application using the second electronic device.

The user session may be continued as an audible-visual session 535, as a visual session 540, or may return to the audible-only session 545 (e.g., after completing the interaction on the visual interface).

Whether the session is continued as an audible-visual session, a visual session or an audible session may be determined by the web application server 315. For example, the user session may be continued as an audible-visual session by default. The user session may be continued as a visual session (without involving the use of the audible interface) if the second electronic device is detected (e.g., by the IoT device manager 350) to move outside the local environment 101 in which the voice assistant device 200 is located. In some examples, the user may be able to explicitly choose whether to continue the session as an audible-visual session, a visual session or an audible session. In some examples, the visual interface may be used only for the complex interaction and the session may automatically return to the audible-only session once the complex interaction has been completed using the visual interface.

Figure 3A:
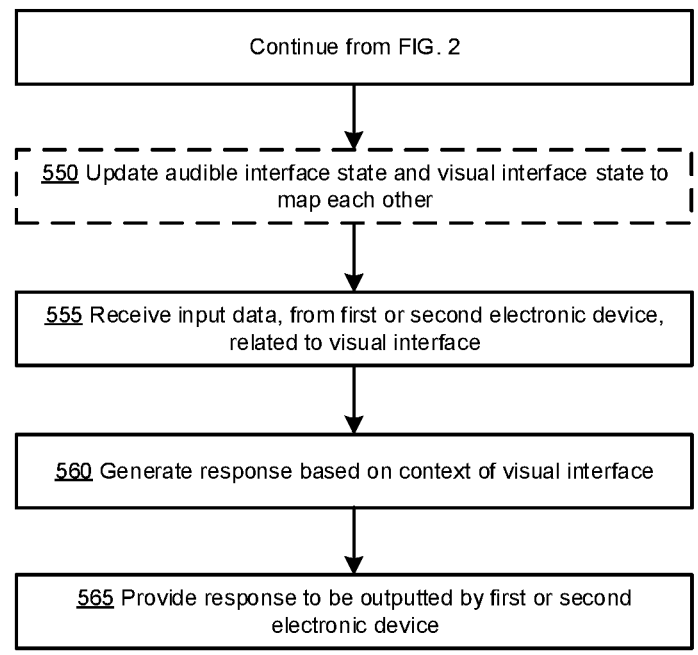
FIG. 3A is a flowchart illustrating an example method for continuing an audible session as an audible-visual session, in accordance with an example embodiment of the present disclosure.

FIG. 3A illustrates an example for conducting the user session that as an audible-visual session 535. The method shown in FIG. 3A may be a continuation of the method of FIG. 2, and may continue to be performed by the web application server 315. An audible-visual session, in the present disclosure, is a user session that is conducted using an audible-only session and a visual session together. The audible-visual session involves an audible interface provided via a first primarily audible device (e.g., the voice assistant device 200) and a visual interface provided via a second electronic device capable of visual output (e.g., the electronic device 400), working together in a complementary fashion.

Optionally, at 550, the audible interface state and visual interface state may be updated so they map to each other. In some examples, this may be performed by the web application server 315 using information stored in the session record database 347. For example, the session record database 347 may contain saved information about the saved interface state, or information about the context of the pushed visual interface. The web application server 315 may use this information to update the audible interface state to track the visual interface state, or vice versa, and may provide this information to the voice assistant device 200 and/or the electronic device 400, to enable each device to generate the audible interface or visual interface, respectively. This may help to ensure that the context of the user session is accurately tracked by both the voice assistant device 200 and the electronic device 400.

At 555, input data is received, from the first or second electronic device. The input data is related to the visual interface (e.g., selection of an option in the visual interface, or verbal question about the output on the visual interface). The user may provide input data via the visual interface using an input device 415, such as a keyboard or touchscreen. The processor 405 of the electronic device 400 receives the user input and may provide the input data to the web application server 315 via the transceiver 420 (or other communication interface). The user may also provide input data via the audible interface, for example using voice commands.

At 560, a response to the input data is generated based on the context of the visual interface. For example, the web application server 315 may process the input data using information saved in the session record database 347 to determine the context. Generating the response may involve determining whether the response should be provided via the audible interface or the visual interface. For example, if the input data received at 555 was received from the first electronic device, then it may be more appropriate to generate the response as an audible response to be outputted by the first electronic device. In another example, if the response is determined to be a complex response (e.g., based on a complexity criteria as discussed previously), it may be more appropriate to generate the response as a visual response to be provided by the second electronic device.

In various examples, an audible response may be provided to a non-audible input; a non-audible response may be provided to an audible input; an audible response may be provided to an audible input; or a non-audible response may be provided to a non-audible input; all during the same audible-visual session.

At 565, the response is provided to be outputted by the first or second electronic device. For example, if the response generated at 560 is an audible response, the web application server 315 may transmit instructions to the voice assistant device 200 to provide the audible response. In another example, if the response generated at 560 is a non-audible response, the web application server 315 may transmit instructions to the electronic device 400 to provide the non-audible response.

Figure 3B:
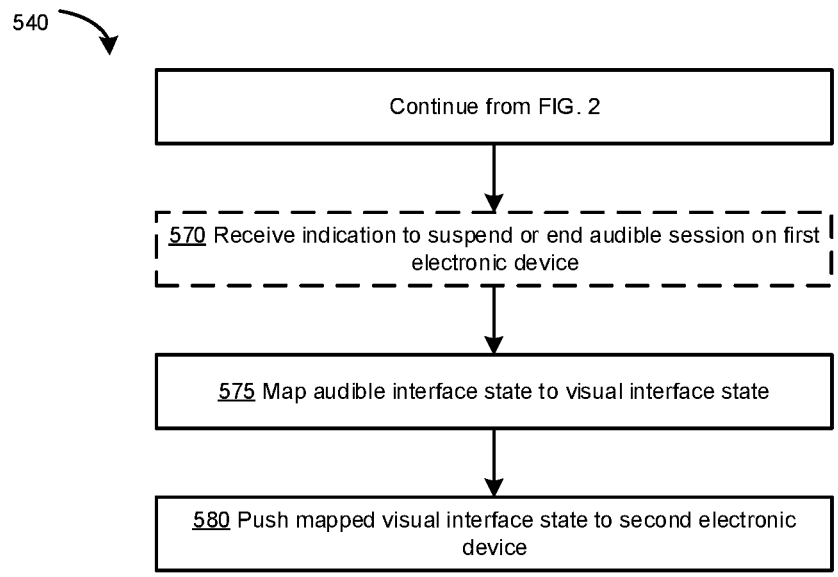
FIG. 3B is a flowchart illustrating an example method for continuing an audible session as a visual session, in accordance with an example embodiment of the present disclosure.

FIG. 3B illustrates an example for conducting the user session as a visual session 540. The method shown in FIG. 3B may be a continuation of the method of FIG. 2, and may continue to be performed by the web application server 315. A visual session, in the present disclosure, is a user session that is conducted using an electronic device providing primarily visual (or non-audible) output, and does not involve the use of a voice assistant device. In order to continue the user session as a visual session, the audible session is transferred to the visual session to be conducted via the visual interface on the second electronic device.

As will be appreciated, transferring a user session between an audible interface on a voice assistant device 200 and a visual interface on an electronic device 400 that provides visual output presents unique challenges. For example, the way a user interacts with an audible interface (e.g., using serial inputs/outputs) may be fundamentally different from the way a user interacts with a visual interface (e.g., capable of parallel inputs, or providing inputs and outputs at the same time). A backend server, such as the web application server 315, may be required to coordinate data between audible and visual interfaces (e.g., by mapping interface states), and to communicate data between the voice assistant device 200 and the electronic device 400 in a seamless and real-time manner. It will be appreciated that a seamless transition from an audible interface to a visual interface (or vice versa) is desirable to provide a positive user experience.

Optionally, at 570, an indication may be received to suspend or end the audible session on the first electronic device. The indication may be an explicit user input (e.g., received from the first or second electronic device) to transfer the session to use the voice interface only. In some examples, the indication may be implicit, for example detecting (e.g., by the IoT device manager 350) that the electronic device 400 has moved out of a defined vicinity of the voice assistant device 200.

Prior to suspending or ending the audible session, the state of the audible interface may be saved and stored in the session record database 347. Information stored in the session record database 347 may enable the user session to be seamlessly continued on the second electronic device, for example, by keeping track of the current state and context of the user session.

At 575, the current audible interface state is mapped to a visual interface state. This mapping may be performed by the web application server 315, using the interface map function 340, for example. Where a saved audible interface state is stored in the session record database 347, the saved audible interface state may be retrieved and used to perform the mapping. Mapping the current audible interface state to a visual interface state may pose unique challenges, because the nature of user interaction with an audible interface (e.g., using serial inputs/outputs) is different from the user of user interaction with a visual interface (e.g., capable of parallel inputs and outputs).

Each audible interface may correspond to a visual interface, such that any user interaction that may be performed using a primarily audible first electronic device (e.g., the voice assistant device 200) may also be performed using a second electronic device providing a visual output (e.g., the electronic device 400), and vice versa. However, there is not necessarily a one-to-one mapping between audible interface states and visual interface states. For example, because audible interactions tend to take place using serial audio inputs/outputs, two or more audible interface states may map to one visual interface state.

It should be noted that mapping the audible interface state to a visual interface state may be performed as part of mapping a complex interaction to a visual interface (e.g., as described above with reference to FIG. 2). In other examples, such as where a complex interaction is mapped to a visual interface that is not fully equivalent to the audible interface, a separate mapping to the visual interface state may be required to transfer the session entirely to a visual session.

At 580, the mapped visual interface state is pushed to the second electronic device. This may be performed similarly to that described above with respect to FIG. 2. The user may then continue the user session as a primarily visual session on the second electronic device.

In some examples, the user session may seamlessly transfer between audible-only session, primarily visual session and audible-visual session. For example, the web application server 315 may be configured to monitor interactions during the user session and determine which type of session is more suitable for the required interaction. The web application server 315 may also be configured to monitor the source of input data (e.g., whether from the first electronic device via the audible interface, from the second electronic device via the visual interface, or both) and select the type of session to suit the user.

Figure 4:
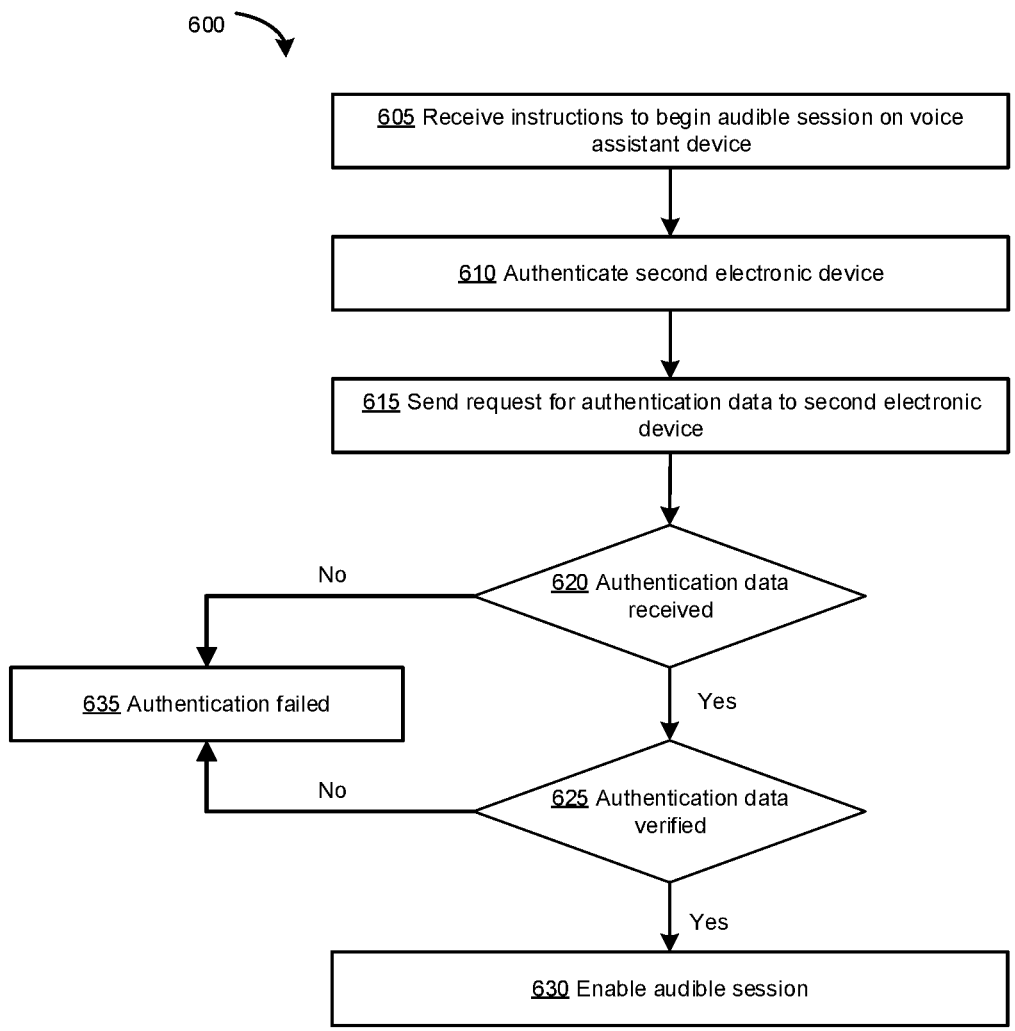
FIG. 4 is a flowchart illustrating an example method for performing authentication for conducting an audible session in accordance with an example embodiment of the present disclosure.

Reference is now made to FIG. 4, illustrating an example method 600 for authenticating a user for an audible session (e.g., as performed at 505 of FIG. 2).

At 605, instructions are received to begin an audible session on a first primarily audible electronic device (e.g., the voice assistant device 200). The instructions may indicate that a new user session is to be initiated as an audible session, or the instructions may indicate that an ongoing user session is to be continued as an audible session.

At 610, the web application server 315 may authenticate the second electronic device (e.g., an electronic device 400 other than the voice assistant device 200) associated with the same user. This may be performed using any suitable authentication techniques, such as an exchange of security certificates. This may be performed in the background, without the user being aware such authentication is taking place. In some examples, 610 may be performed by the authorization server API 325 of the web application server 315.

At 615, the web application server 315 sends a request for authentication data to the second electronic device. For example, the authorization server API 325 of the web application server 315 may generate the user authentication request. The web application server 315 typically requires a specific form of user authentication. However, the web application server 315 could permit user authentication in one of a number of approved forms of user authentication. User authentication may be performed via user credentials, such as a combination of user name and shared secret (e.g., password, passcode, PIN, security question answers or the like), biometric authentication, a digital ID protocol or a combination thereof among other possibilities. The request for authentication data may specify that authentication data is to be provided via the second electronic device, via the first electronic device, or either first or second electronic devices. For example, the request may require a passcode provided for display on the second electronic device to be provided by audible input to the first electronic device.

At 620, it is determined whether authentication data has been received. Authentication data may be received from the first or the second electronic device. For example, if the user provides input for authentication on the second electronic device, this input may be transmitted to the authorization server API 325 by the electronic device (e.g., using transceiver 420). In some examples, if the request sent at 615 specifies that authentication data is to be provided via a specified electronic device, any authentication data provided via a different device other than the specified device may be ignored. If authentication data is received, the method 600 proceeds to 625.

At 625, it is determined whether the authentication data is verified. For example, the authorization server API 325 may verify the received authentication data using suitable techniques, such as comparing against stored records.

In some examples, 620 and 625 may be performed on the second electronic device without involving the web application server 315. For example, the verification of authentication data may be performed locally on the electronic device 400, and the web application server 315 may be only informed whether authentication was verified or not verified. Performing verification locally may be preferable for increased security when authentication data includes biometric factors, such as fingerprint facial recognition, by ensuring that biometric data, such as biometric samples, biometric patterns and/or biometric matching criteria used for comparison, are stored locally. The local storage of biometric data reduces the likelihood that biometric data may be exposed compared with storing biometric data on the web application server 315.

At 630, after determining that authentication data has been verified (e.g., via performing the verification by the authorization server API 325 or via receiving data from the second electronic device indicating that local verification was successful), the audible session may be enabled on the primarily audible first electronic device.

If the authentication fails at 620 (e.g., no authentication data was received within a defined time period) or 625 (e.g., received authentication data fails verification), the method 600 proceeds to 635 to indicate that authentication failed. A notification may be sent to the voice assistant device 200 and/or the second electronic device 400. The notification may be outputted to the user (e.g., audibly via the voice assistant device 200 and/or visually via the electronic device 400), and the user may be prompted to try again. A predetermined number of authentication attempts may be permitted before a lockout or other security measure is performed.

In some examples, authentication of a user for an audible session may be performed using other techniques. For example, a user may be authenticated for an audible session on a first primarily audible electronic device (e.g., the voice assistant device 200) by determining that the second electronic device (e.g., the electronic device 400) that is associated with the user (and which may have been authenticated as described at 610 above) is in the local environment 101 in which the first electronic device is located. This may provide a lower level of security, which may enable the user to access less sensitive information (e.g., accessing general, non-personal information) with less hassle.

Figure 5:
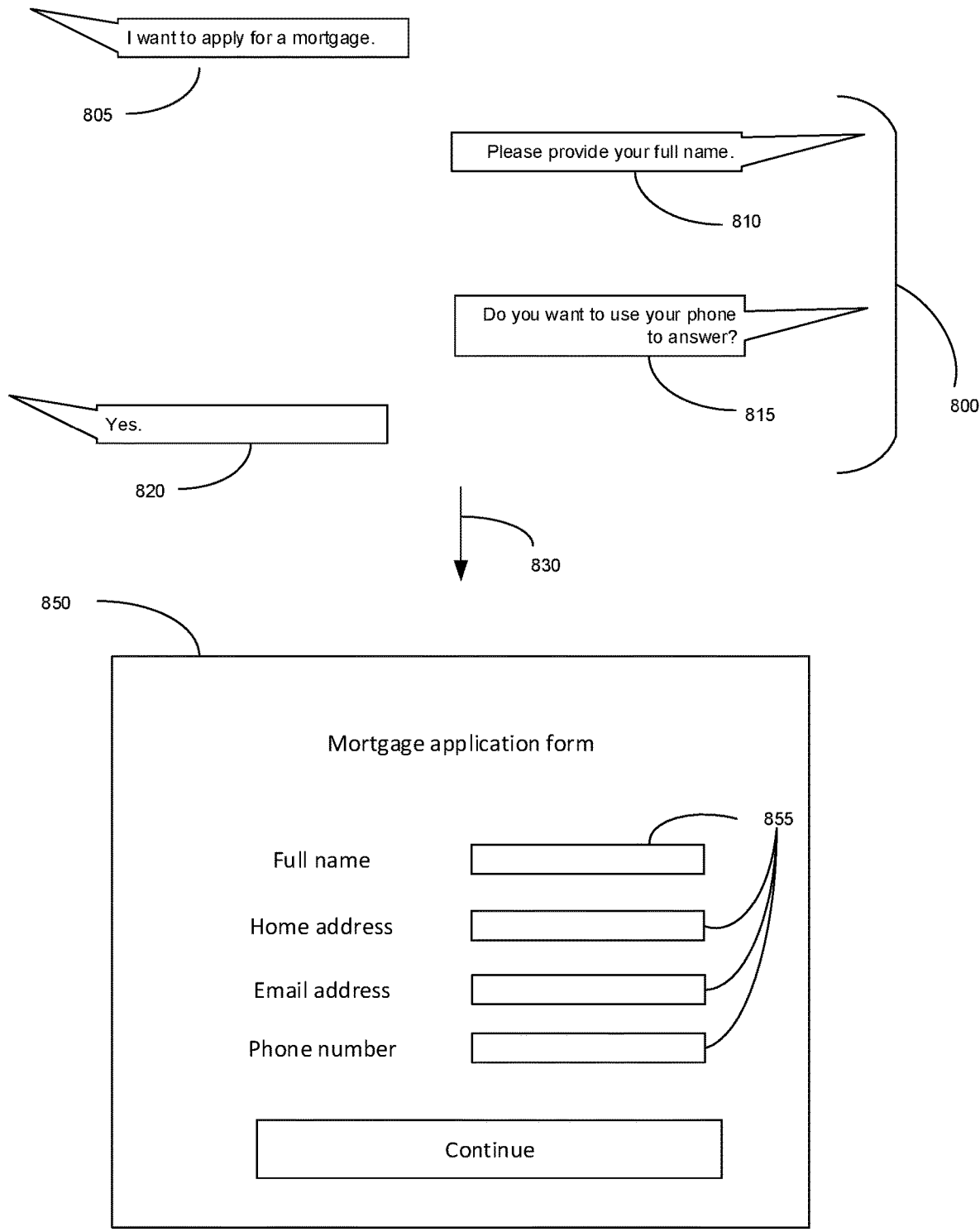
FIG. 5 illustrates an example of mapping a complex interaction to a visual interface in accordance with an example embodiment of the present disclosure.
Figure 6:
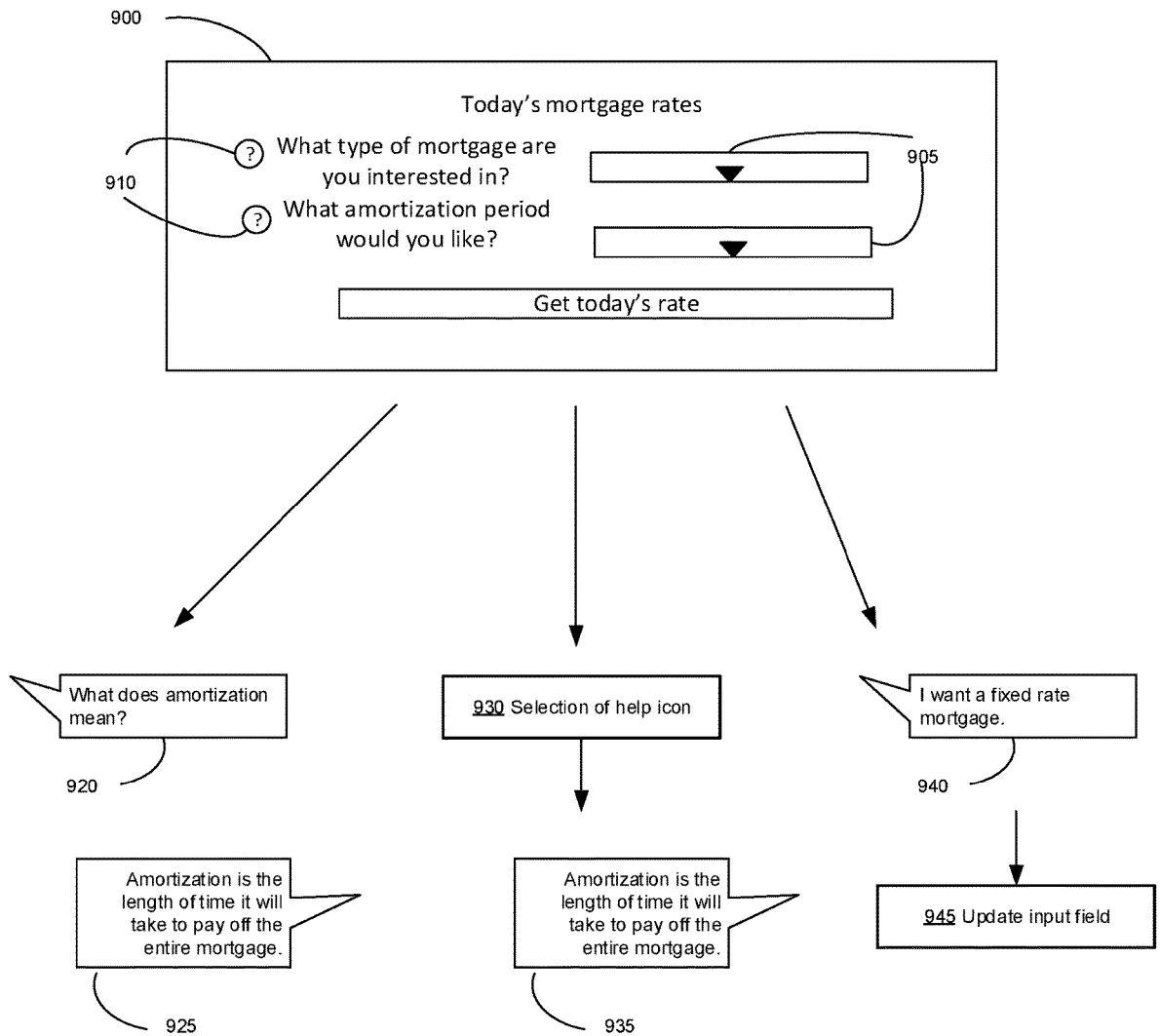
FIG. 6 illustrates examples of how an audible interface and a visual interface may be used in a complementary manner, taking into account the context of the visual interface, in accordance with an example embodiment of the present disclosure.

Examples of audible and visual interfaces are shown in FIGS. 5 and 6, to illustrate how a user session may be conducted using audible and visual interfaces, including for completion of a complex interaction. FIGS. 5 and 6 illustrate example interfaces for a web application relating to a mortgage. Other interfaces may be provided for responding to other types of user requests including, for example, a request for information regarding a product, filling an application, a request to transfer funds, or an inquiry about a user's transactions, among other possibilities.

FIG. 5 illustrates an example of a complex interaction during an audible session that is mapped to a visual interface. The audible interface 800 may be initiated with an audible input 805 requesting a mortgage application, for example. The audible input 805 may be parsed to determine an intent (e.g., using the NLP function 239 of the voice assistant device 200) and provided as input data to the web application server 315. The web application server 315 may process the input data and determine the applicable web application and/or the applicable state for the audible interface. The web application server 315 may provide instructions to the voice assistant device 200 to enable the audible interface function 237 to provide the appropriate audible interface state. Alternatively, the web application server 315 or voice assistant server 305 may store instructions for implementing the audible interface, and the voice assistant device 200 may be provided instructions to simply generate the appropriate audible output.

The audible interface 800 may proceed to a first state 810 to request user input. At a backend server (e.g., the web application server 315), it may be determined that the requested input (e.g., input of the user's full name) is a complex interaction (e.g., determined based on one or more complexity-determining rules). In this example, the audible interface 800 provides a prompt 815 asking if the user wishes to perform the interaction using a visual interface. The user may provide confirmation 820. The interaction may then be mapped 830 to a visual interface 850 to perform the complex interaction. In this example, the visual interface 850 may be a visual form (which may be generated by the web application server 315, or retrieved by the web application server 315 from a database) having a plurality of input fields 855. It should be noted that although the complex interaction that triggered use of the visual interface 850 was input of a user's full name, the visual interface 850 may enable additional interactions, such as additional input fields (e.g., input of home address, email address and phone number).

In some examples, when the interaction is mapped to the visual interface, one or more fields of the visual interface may be automatically completed using information obtained via the audible interface. When input data is received via the audible interface, such information may be saved into the session record database 347, and when the web application server 315 generates the visual interface for the complex interaction, such saved information may be retrieved from the session record database 347 to partially complete the input fields of the visual interface. For example, the user may have already provided a phone number via audible input. This information may be automatically populated into the corresponding input field in the visual interface, so that the user does not have to re-enter this information.

FIG. 6 illustrates an example of how a visual interface may be used together with an audible interface, for example during an audible-visual session as disclosed herein. The visual interface 900 may be provided as a result of having detected a complex interaction. In this example, the visual interface 900 includes one or more input fields 905, and also includes one or more selectable options (e.g., help icons). As the user views and interacts with the visual interface 900, the web application server 315 may, in the background, update the session record database 347 to track the state of the visual interface 900 and ensure that the audible interface matches the context of the visual interface.

For example, while viewing the visual interface 900, the user may provide audible input 920. The audible input 920 may be parsed into an intent by the voice assistant device 200 and transmitted as input data to the web application server 315. The intent may be processed by the web application server 315, taking into account the context of the visual interface 900. Thus, in this example, the web application server 315 may generate a response to the question "what does amortization mean" within the context of mortgages. The web application server 315 may then transmit instructions to the voice assistant device 200 to output the response as an audible output 925. In other examples, the web application server 315 may transmit instructions to the second electronic device 400 to output the response as a non-audible output (e.g., as a pop-up window on the visual display).

In another example, the user may interact with the visual interface 900, for example, at 930 selecting a help icon 910 next to the input field for amortization period. The web application server 315 may receive this input from the second electronic device and may process this to generate a response, in the context of the visual interface 900. The web application server 315 may then transmit instructions to the voice assistant device 200 to output the response as an audible output 935. In other examples, the web application server 315 may transmit instructions to the second electronic device 400 to output the response as a non-audible output (e.g., as a pop-up window on the visual display).

In another example, while viewing the visual interface 900, the user may provide audible input 940. The audible input 940 may be parsed into an intent by the voice assistant device 200 and transmitted as input data to the web application server 315. The intent may be processed by the web application server 315, taking into account the context of the visual interface 900. Thus, in this example, the web application server 315 may determine that the intent is to complete an input field 905 of the visual interface 900. The web application server 315 may then transmit instructions to the second electronic device, at 945, to update the input field 905 with the input data. The web application server 315 may, in the background, update the session record database 347 to indicate that the particular input field has been completed, to enable the audible interface state to track the state of the visual interface.

In this way, the audible interface and the visual interface may be used together in a complementary fashion, for example to complete a complex interaction, thus providing a more seamless user experience.

Although the present disclosure is described, at least in part, in terms of methods, a person of ordinary skill in the art will understand that the present disclosure is also directed to the various components for performing at least some of the aspects and features of the described methods, be it by way of hardware (digital signal processors (DSPs), application specific integrated circuits (ASICs), or field-programmable gate arrays (FPGAs)), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a data manager) to execute examples of the methods disclosed herein.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

All values and sub-ranges within disclosed ranges are also disclosed. Also, although the systems, devices and processes disclosed and shown herein may comprise a specific plurality of elements/components, the systems, devices and assemblies may be modified to comprise additional or fewer of such elements/components. For example, although any of the elements/components disclosed may be referenced as being singular, the embodiments disclosed herein may be modified to comprise a plurality of such elements/components. The subject matter described herein intends to cover and embrace all suitable changes in technology.

The term "processor" may comprise any programmable system comprising systems using micro- or nano-processors/controllers, reduced instruction set circuits (RISC), ASICs, logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A server comprising:
a communication interface for communication with a first primarily audible electronic device and a second electronic device having a visual output device; and
a processor coupled to the communication interface and configured to cause the server to:
during an audible-only user session conducted via an audible interface provided by the first electronic device, determine that an interaction in the user session is a complex interaction by applying a complexity-determining rule to the interaction, where applying the complexity-determining rule comprises calculating a complexity metric for the interaction and comparing the complexity metric to a complexity threshold;
map the interaction to a mapped visual interface; and
push the mapped visual interface to the second electronic device, to enable at least the interaction of the user session to be carried out via the second electronic device.

2. The server of claim 1, wherein the processor is configured to cause the server to determine that the interaction is the complex interaction by applying more than one complexity-determining rule to the interaction.

3. The server of claim 1, wherein the processor is further configured to cause the server to map the interaction to the mapped visual interface by generating the mapped visual interface.

4. The server of claim 3, wherein the processor is further configured to cause the server to generate the mapped visual interface based on one or more contextual factors.

5. The server of claim 1, wherein the processor is further configured to cause the server to:
conduct the user session as an audible-visual session using both the audible interface and the mapped visual interface, wherein a current state of the visual interface and a current state of the audible interface are mapped to each other.

6. The server of claim 5, wherein the processor is further configured to cause the server to:
during the audible-visual session, receive, from the first electronic device, input data related to the visual interface; and
generate and send, to the first electronic device or the second electronic device, a response to the input data, the response being generated based on a context of the visual interface.

7. The server of claim 1, wherein the processor is further configured to cause the server to:
transfer the user session to be conducted as a visual session on the second electronic device via the mapped visual interface.

8. The server of claim 7, wherein the processor is further configured to cause the server to transfer the user session by:
mapping a current audible interface state to one of a plurality of visual interface states defined for a visual interface; and
generate and send, to the second electronic device, a pushed mapped visual interface state, to enable the user session to be continued as a visual session on the second electronic device.

9. The server of claim 1, wherein the mapped visual interface comprises at least one of:
visual output data;
one or more input fields; and
visual output data generated from audible input data received via the audible interface.

10. The server of claim 1, wherein pushing the mapped visual interface comprises transmitting a deep link to the mapped visual interface.

11. The server of claim 1, wherein the processor is further configured to cause the server to:
detect availability of the second electronic device; and
push the mapped visual interface to the second electronic device after detecting the second electronic device is available.

12. The server of claim 1, wherein the complexity metric is an expected time for a user to progress from one audible interface state to a next audible interface state, and the complexity threshold is a predetermined threshold time.

13. The server of claim 12, wherein the expected time comprises an expected time to output an audible request from the audible interface and an expected time required for providing one or more expected audible responses.

14. The server of claim 1, wherein the complexity metric is a number of words in an output, and the complexity threshold is a predetermined number of words in the output.

15. The server of claim 1, wherein the complexity metric is a number of input fields requested, and the complexity threshold is a predetermined number of input fields requested.

16. A method for conducting a user session using at least two electronic devices, the method comprising:
during an audible-only user session conducted via an audible interface provided by a first electronic device, determining that an interaction during the user session is a complex interaction by applying a complexity-determining rule to the interaction, where applying the complexity-determining rule comprises calculating a complexity metric for the interaction and comparing the complexity metric to a complexity threshold;

mapping the interaction to a mapped visual interface; and pushing the mapped visual interface to a second electronic device, to enable at least the interaction of the user session to be carried out via the second electronic device.

17. The method of claim 16, wherein determining that the interaction is the complex interaction comprises applying more than one complexity-determining rule to the interaction.

18. The method of claim 16, further comprising:
conducting the user session as an audible-visual session using both the audible interface and the mapped visual interface.

19. The method of claim 18, further comprising:
during the audible-visual session, receiving, from the first electronic device, input data related to the visual interface; and
generating a response to be provided by the first electronic device or the second electronic device, the response being generated based on a context of the visual interface.

20. The method of claim 16, further comprising:
transferring the user session to be conducted as a visual session on the second electronic device via the mapped visual interface, the transferring including:
mapping a current audible interface state to one of a plurality of visual interface states defined for a visual interface; and
pushing the mapped visual interface state to the second electronic device, to enable the user session to be continued as a visual session on the second electronic device.

21. A server comprising:
a communication interface for communication with a first primarily audible electronic device and a second electronic device having a visual output device; and
a processor coupled to the communication interface and configured to cause the server to:
during an audible-only user session conducted via an audible interface provided by the first electronic device, determine that an interaction in the user session is a complex interaction by applying a complexity-determining rule to the interaction, where applying the complexity-determining rule comprises determining that the interaction is of a predefined interaction category;
map the interaction to a mapped visual interface; and
push the mapped visual interface to the second electronic device, to enable at least the interaction of the user session to be carried out via the second electronic device.

22. The server of claim 21, wherein the predefined interaction category is one of:
a predefined type of input or output;
a predefined format of input or output;
input or output of a predefined security level; or
input or output associated with a predefined label.

23. The server of claim 22, wherein the predefined interaction category is a predefined type of input that is an input of contact information.

24. The server of claim 22, wherein the predefined interaction category is a predefined format of output that is a pictorial or table format of output.

25. The server of claim 22, wherein the predefined interaction category is input or output of a predefined security level that is input or output of personal information.

26. The server of claim 21, wherein the complexity-determining rule further comprises calculating a complexity metric for the interaction and comparing the complexity metric to a complexity threshold.

27. The server of claim 21, wherein the processor is further configured to cause the server to:
conduct the user session as an audible-visual session using both the audible interface and the mapped visual interface, wherein a current state of the visual interface and a current state of the audible interface are mapped to each other.

28. The server of claim 21, wherein the processor is further configured to cause the server to:
detect availability of the second electronic device; and
push the mapped visual interface to the second electronic device after detecting the second electronic device is available.

* * * * *